United States Patent
Olszak (10) Patent No.: US 7,330,574 B2
(45) Date of Patent: Feb. 12, 2008

(54) BEST-FOCUS ESTIMATION BY LATERAL SCANNING

(75) Inventor: Artur G. Olszak, Tucson, AZ (US)

(73) Assignee: Ometrix, Inc., Tucson, AZ (US)

( * ) Notice: Subject to any disclaimer, the term of this patent is extended or adjusted under 35 U.S.C. 154(b) by 1101 days.

(21) Appl. No.: 10/431,937

(22) Filed: May 8, 2003

(65) Prior Publication Data

US 2004/0223632 A1    Nov. 11, 2004

(51) Int. Cl.
*G06K 9/00* (2006.01)
(52) U.S. Cl. .................... 382/128; 128/922; 378/4; 356/501
(58) Field of Classification Search ............. 382/100, 382/128, 131, 132, 133; 356/39, 501; 367/56, 367/57; 712/10, 16
See application file for complete search history.

(56) References Cited

U.S. PATENT DOCUMENTS

| | | | | |
|---|---|---|---|---|
| 5,578,832 | A * | 11/1996 | Trulson et al. ........... | 250/458.1 |
| 6,025,601 | A * | 2/2000 | Trulson et al. ........... | 250/461.2 |
| 6,107,637 | A * | 8/2000 | Watanabe et al. ........ | 250/559.3 |
| 6,332,568 | B1 | 12/2001 | Christenson | |
| 6,341,180 | B1 | 1/2002 | Petterson et al. | |
| 6,388,809 | B1 * | 5/2002 | MacAulay .................. | 359/383 |
| 6,449,048 | B1 * | 9/2002 | Olszak ....................... | 356/497 |
| 6,517,665 | B1 | 2/2003 | Boehme et al. | |
| 6,734,967 | B1 * | 5/2004 | Piwonka-Corle et al. ... | 356/369 |
| 2002/0090127 | A1 | 7/2002 | Wetzel et al. | |

FOREIGN PATENT DOCUMENTS

WO    WO 02/075370 A2    9/2002

* cited by examiner

*Primary Examiner*—Bhavesh M Mehta
*Assistant Examiner*—Anand Bhatnagar
(74) *Attorney, Agent, or Firm*—Antonio R. Durando (57) ABSTRACT

The sample stage of an array microscope is tilted in the scanning direction such that the best-focus plane of the array microscope intersects the surface of the sample during the scan. As a result of the tilt, the distance from the sample surface of each miniaturized microscope spanning the array varies from point to point on the surface. Accordingly, the best focal distance for each such point on the sample surface is identified by tracking the quality of its focus as the sample surface travels across the rows of microscopes in the array. Best focus may be detected using any known technique, such as by measuring spatial frequency content and recording the scan position corresponding to maximum mid-range frequency content. This information is used to develop a best-focus axial-position map for use while performing a subsequent measurement scan.

44 Claims, 10 Drawing Sheets

BEST-FOCUS ESTIMATION BY LATERAL SCANNING

BACKGROUND OF THE INVENTION

1. Field of the Invention

This invention is related in general to the field of microscopy. In particular, it relates to a method and apparatus for finding the best-focus position of a scanning array microscope that includes a plurality of optical imaging elements with respective optical axes.

2. Description of the Related Art

The object to be imaged by a microscope is typically located at the object plane by being placed on a substrate that is, in turn, positioned on a stage of the microscope that can be moved laterally with respect to the optical axis of the lens system. The stage may be motorized so that this movement may be automated or controlled by a computer. Moreover, the image plane may be provided with a camera or other imaging device for recording the image, or for monitoring the image under the same computer control.

In addition to being characterized by its numerical aperture, an imaging lens system is also characterized by its field of view. The field of view in visible light microscopes typically ranges from tens of microns to a few millimeters. This means that a macroscopically sized object of 20 mm×50 mm, for example, requires many movements of the stage for imaging the entire object. The stage manipulation and the consequent time required to image an object under high magnification is particularly troublesome in pathology analysis because the diagnostic information in the tissue may be located in only a small portion of the object that is being imaged.

A recent innovation in the field of light microscopy addresses this problem using a miniaturized microscope array which, when applied to a common object, is also referred to as an "array microscope." As described in commonly owned PCT/US02/08286, herein incorporated by reference, each miniaturized microscope includes a plurality of optical elements individually positioned with respect to a corresponding image plane and configured to image respective sections of the object. The array further includes a plurality of image sensors corresponding to respective optical elements and configured to capture image signals from respective portions of the object.

Figure 1:
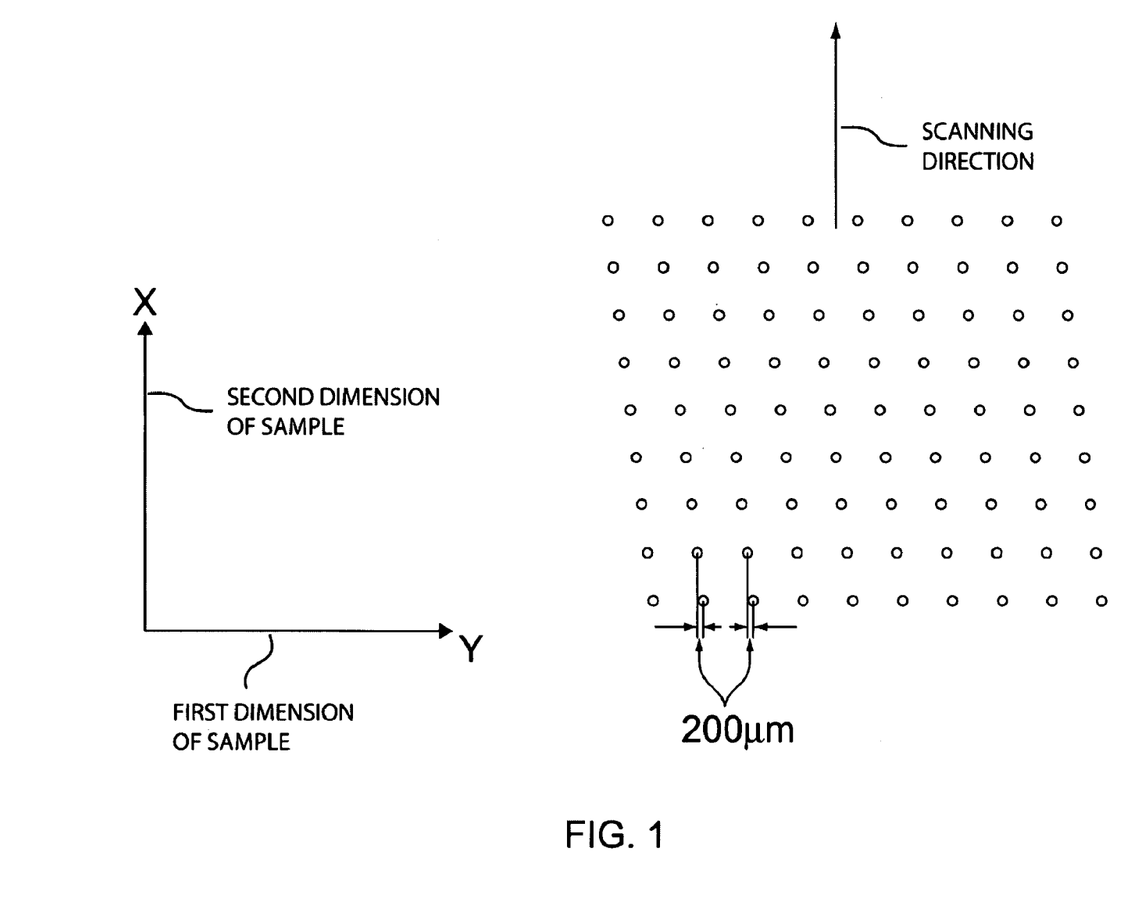
FIG. 1 is a simplified schematic representation of the fields of view in an array-microscope layout of 99 miniaturized microscopes in an array of 9 rows of individual microscopes disposed transversely and 11 columns of microscopes disposed at a slight angle, respectively, with respect to the direction of scanning, such that a complete coverage of the sample surface is achieved during a scan.

In such an array microscope, a linear array of miniaturized microscopes is preferably provided with adjacent fields of view that span across a first dimension of the object (also referred to herein as y direction), and the object is translated past the fields of view across a second dimension (x direction) to image the entire object. Because each miniaturized microscope is larger than its field of view (having respective diameters of about 1.8 mm and 200 µm, for example), the individual microscopes of the imaging array are staggered in the direction of scanning so that their relatively smaller fields of view are offset over the second dimension but aligned over the first dimension, as illustrated in FIG. 1. Thus, the detector array provides an effectively continuous linear coverage along the first dimension which eliminates the need for mechanical translation of the microscope in that direction, providing a highly advantageous increase in imaging speed by permitting complete coverage of the sample surface with a single scanning pass along the second dimension.

As always in microscopy, the value of a procedure is a function of the quality of the images produced by it. Thus, the ability to maintain a sharp image during scanning of the test object through the microscope is essential for obtaining good-quality results. This is particularly difficult to achieve when high numerical-aperture microscopic imaging is used, which is characterized by small depths of field often in the order of less than 1 µm. Moreover, in typical biological microscopy, such as used in the field of pathology, the sample material is deposited on a transparent slide and covered with a layer of fixing medium and a cover glass. Often these samples exhibit significant variations in the thickness of the tissue, the fixing medium, and the cover glass, which requires different axial positions of the microscope for best-focus imaging of different parts of the sample. For example, the deviation from perfect flatness of the slides used in biological microscopy is by itself often greater than the depth of focus of the imaging optics. Therefore, a scan of the entire slide at a fixed focal distance necessarily produces variations in the image quality between different sections of the slide, which may require refocusing during a scan in function of the location of the image of interest on the slide.

In order to avoid refocusing of the imaging optics during a scan, a pre-scan run is often performed with conventional microscopes in order to acquire data used to find best-focus locations for different sections of the test slide. These locations are then used to guide the subsequent scanning process for that particular slide. In general, these prior-art pre-scan systems are based on the concept of selecting a number of points on the test surface, either randomly or according to judiciously selected criteria, and finding the best-focus position for each such point. As is well understood in the art, best focus may be determined by a variety of methods, such as, for instance, by finding the optical-axis position that produces maximum contrast or by analyzing the high-frequency content of the signal at each point. The information is then used in some manner to construct a best trajectory for the scanning operation. For instance, U.S. Publication No. 2002/0090127 teaches the development of a focus surface based on the best-focus position of at least three points on the test surface. Inasmuch as the implementation of this procedure with conventional microscopes requires positioning of the optical system in front of each selected point and searching for the best-focus axial position at each location, this approach is slow and not well suited for parallel-imaging devices such as the array microscopes described in PCT/US02/08286.

In view of the unsuitability and shortcomings of the prior-art focusing methods when applied to array microscopes, it would be very desirable to provide an approach that affords the flexibility of operating within the entire range of the sample surface without loss of continuity, precision or resolution. This invention provides a novel solution to that end.

BRIEF SUMMARY OF THE INVENTION

U.S. Pat. No. 6,449,048 describes an interferometer where the sample surface is scanned laterally and continuously with respect to the optical axis of the interferometric objective. The resulting scan produces a profile of the entire sample surface in a single pass, eliminating the need to repeat interferometric measurements as the interferometer's objective is placed over different sections of the sample. The objective is tilted, so that the sample surface is placed at an angle with respect to the maximum coherence plane of the instrument. By moving the sample laterally, at an angle, substantially through the focal plane at a set distance from the objective on the objective's optical axis, rather than vertically along the optical axis, different parts of the sample surface intersect the maximum coherence plane at different times as the sample object passes through the coherence plane, the precise time depending on the profile of the surface.

When the optical path difference (OPD) of a point on the object's surface is greater than the coherence length of the light source, the intensity of the light reflected from this point does not produce interference fringes. However, interference effects modulate the intensity the same way as in a regular vertical-scanning interferometry (VSI) procedure when the object point enters the zone of coherence. As the object moves along the direction of scanning, because of the tilt of the objective's optical axis with respect to the scanning plane, the sample's motion includes an axial component relative to the objective. Therefore, the lateral scanning motion produces an OPD variation like the vertical scan in a conventional system. As a result, light-intensity data can be acquired continuously as the test surface is scanned. Thus, according to the main objective of the invention described in U.S. Pat. No. 6,449,048, lateral scanning eliminates the need for taking multiple measurements over the sample surface and for stitching sub-sets of data to form a larger composite image.

Accordingly, the prior art teaches that lateral scanning can be used advantageously to scan a sample surface on a continuous basis for interferometric analysis. The only practical requirement is that the sample surface be sufficiently tilted with respect to the optical axis of the interferometric objective to ensure that all points on the surface pass through the coherence zone within the field of view of the objective. The heart of the present invention is in the realization that the same concept can be used successfully to find the best-focus position with respect to a sample surface for each miniaturized microscope in an array microscope of the type described in PCT/US02/08286. By scanning laterally, the process can be carried out while the slide or other sample object is being scanned continuously to image its entire surface area.

The best-focus location of an array microscope (i.e., the location where the image produced by the array microscope is as sharp as allowed by system optics) coincides substantially with a plane at a given distance from the array. (Note that this is true only if the focal positions of all miniaturized objectives lie on the same plane, an assumption which is made here for simplicity of description.) The fact that this plane has a significant extension along the scanning direction can be advantageously used to detect concurrently the best-focus location for various segments of the sample surface. Thus, the present invention is implemented by tilting the sample with respect to the array of miniaturized microscopes (or viceversa) in the scanning direction such that the best-focus plane of the array microscope intersects the surface of the sample during the scan. As a result of the tilt, the distance from the sample surface of each miniaturized microscope spanning the array varies from point to point on the surface. Accordingly, the best focal distance for each such point on the sample surface can be identified by tracking the quality of its focus as the sample surface travels across the rows of microscopes in the array. Best focus may be detected using any known technique, such as, for example, by measuring contrast and recording the scan position corresponding to maximum contrast.

As mentioned above, array microscopes are capable of scanning the entire span of a sample slide in a single pass. This is accomplished by parallel imaging using a large number of miniaturized microscopes arranged into an array of staggered rows several millimeters deep along the scanning direction (note that staggering the rows of the array produces linear columns of microscopes that are not parallel to the direction of scanning, as illustrated in FIG. 1). Rather, they are aligned at an angle designed to produce full coverage of the sample surface during a single scan. (Different combinations of individual optical systems may be used; e.g., hexagonal, rectangular, etc.) Each microscope is coupled to a corresponding individual detector that includes a one- or two-dimensional matrix of pixels adapted to image the portion of the sample surface that falls within the field of view of the microscope. Thus, according to an important aspect of the invention, the axial position of the array with respect to the sample object is adjusted to ensure that the sample surface intersects the best-focus plane within the field of view of the whole array microscope. As long as during scanning the object remains between the extreme positions of the best-focus plane across the field of view of the array, one or more individual detectors will see the image of some point on the sample surface in sharp focus. Inasmuch as the scanning position of the sample surface in relation to the array microscope is continuously tracked during a scan, the data acquired from the scan can be analyzed to determine which of the miniaturized optical systems along the scanning direction recorded a best focus position for corresponding points on the sample surface. Thus, a corresponding optimal axial position can be determined for these points for use during the measurement scan, and appropriate best-focus estimates may be made by interpolation or other techniques for all other points, if desired.

Figure 2:
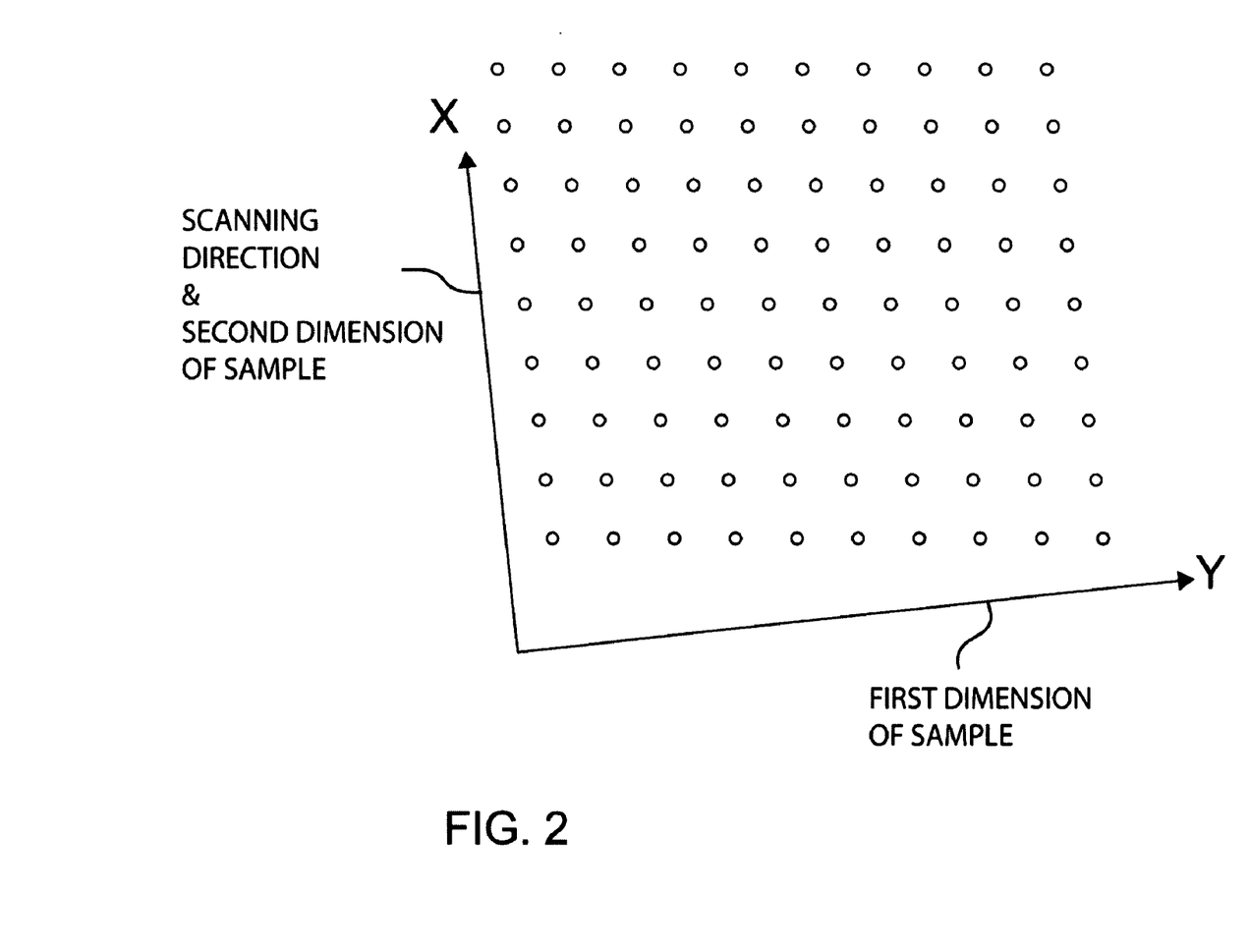
FIG. 2 illustrates the position of array of FIG. 1 after rotation to align the columns of individual miniaturized microscopes with the direction of scanning of the imaging system of the invention.

The invention may be implemented in different manners depending on the exact position of the array microscope in relation to the sample surface. According to one embodiment, the array microscope is rotated slightly before tilting and scanning for best-focus analysis, so as to align the columns of miniaturized optical elements along the direction of scanning, as illustrated in FIG. 2. As a result of this relative orientation between the array and the sample, those points of the sample surface that are aligned with a column of microscopes will fall within the view of all microscopes in that column during a scan. Accordingly, the best-focus position for these points is determined by identifying the microscope in the column that registered maximum (or near maximum) contrast. Best focus for all other points (which do not fall within the array's field of view) may be estimated on the basis of these measurements.

According to another embodiment of the invention, the array microscope is not rotated to align the columns of miniaturized optical elements with the scanning direction X, but is instead only tilted with respect to the sample retaining the configuration of FIG. 1. The sample is scanned in a continuous pass as described above for the first embodiment. In this case, because of the staggered arrangement of the rows in the array, the entire surface of the sample passes within the field of view of the array microscope, but each point on the surface is imaged only once by a single miniaturized microscope. As a result, contrast data are acquired for each point on the sample surface, but only by one microscope of the array (note that surface flatness and focal distance are slowly varying functions of position and, therefore, it is not necessary to acquire data for each point). Thus, a sequence of contrast measurements is not available to detect the position of maximum contrast. Instead, the locations of maximum (or near maximum) contrast are identified by selecting the points with maximum-contrast values among those measured throughout the surface of the sample. These points are assumed to have been imaged at or near the best-focus plane of the imaging system. Accordingly, they are used as points of reference, as in the previous embodiment of the invention. The contrast information acquired for all other points is then used, according to some empirical criterion, to estimate their best-focus position relative to the array microscope.

The information acquired during such a pre-scan of the sample surface under either embodiment of the invention is used to develop a map of best-focus positions for each point on the surface. This map is then advantageously utilized to improve the quality of the images acquired during the subsequent measurement scan of the sample. In order to implement this feature of the invention, the sample stage (or, equivalently, the array microscope) is coupled to a support mechanism that allows its height adjustment as well as its rotation both along the sample's width and length (first and second dimensions, respectively, in FIG. 1). As the sample is scanned under the array microscope, the relative position of the two is adjusted by lifting or lowering the sample and by rotating it along both axes as necessary to optimize the focal position of each point of the surface as it passes through the field of view of a corresponding miniaturized microscope. The best-focus map developed according to the invention is tracked during the scan using conventional robotics apparatus.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The invention is based on the realization that the best-focus position of a sample being imaged by an array microscope can be estimated by continuously scanning the sample surface along a plane that is tilted with respect to the array's best-focus plane. By scanning the sample across the tilted best-focus plane of the array microscope, the axial positions of points being imaged under best-focus conditions can be directly identified as a result of a single scan. If required, the best-focus position of the other points on the surface can be estimated by interpolation or other technique. Thus, with a single measurement it is possible to generate data that can then be used advantageously to improve the image quality during a subsequent measurement scan.

As used herein, the term "microscope" is used with reference to both the array microscope and the individual miniaturized microscopes within the array, and it is assumed that the distinction will be apparent to those skilled in the art from the context of the description. The terms "field of view" and "focal depth" or "depth of field" are similarly applied to both. The terms "focal plane" and "best-focus plane" are used interchangeably to indicate the plane over which the foci of all miniaturized microscopes lie (assuming they are fixed along the same plane). The term "axial" is intended to refer to the direction of the optical axis of the array microscope used for the invention. To the extent that all miniaturized microscopes in such an array are likely to have parallel optical axes, axial also refers to the direction of the optical axis of each individual microscope. The terms "transverse" and "longitudinal" are used to refer to the directions along the width and the length, respectively, of the sample surface. Longitudinal also refers to the scanning direction of the sample with respect to the array microscope (or vice versa). A "row" of microscopes (or objectives or other miniaturized elements) refers to the plurality of such items aligned along the direction substantially transverse to the sample surface. A "column" of microscopes (or objectives or other miniaturized elements) refers to the plurality of such items aligned along the direction substantially longitudinal to the sample surface.

The x coordinate in this disclosure is used with reference to the scanning direction of a flat sample stage or fixture, which is described as if lying on an x,y coordinate plane. X direction, scanning direction, and lateral direction are used interchangeably to refer to the direction of motion of the sample stage relative to the array microscope, or vice versa, during scanning of a sample surface. The z coordinate is perpendicular to the x,y plane of the sample stage.

Finally, the term "lateral scanning" refers to the motion of the sample stage with respect to the array microscope, or vice versa, so that various contiguous portions of the sample surface successively cross the focal plane of the imaging optics during the scan. In some particular applications designed to image surfaces having non-flat geometries, the sample stage may not be flat or the sample itself may be scanned directly without the support of a fixture, such as when rollers are imaged. In such cases, lateral scanning is intended to refer to the curvilinear motion of the sample surface through the optical axis of the imaging objective, or vice versa.

Figure 3:
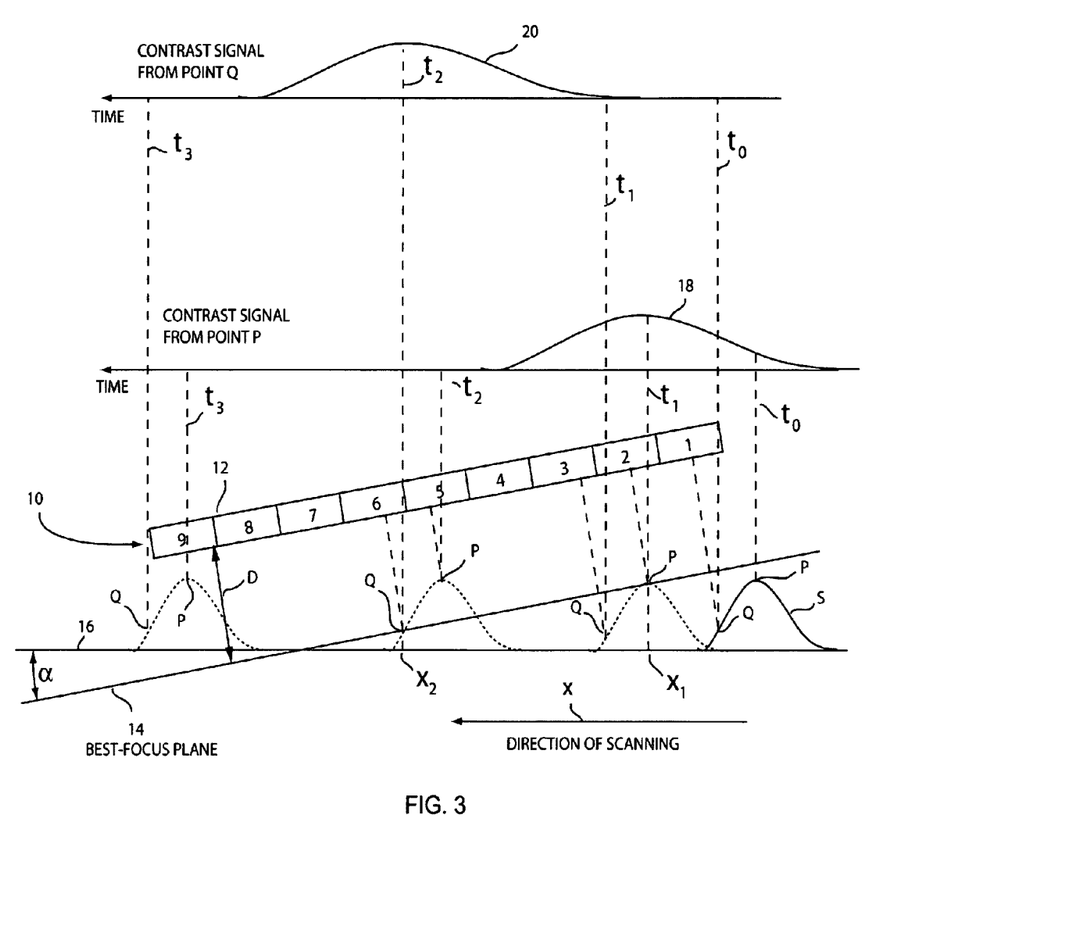
FIG. 3 illustrates two points on the surface of a sample passing through the best-focus plane of the array microscope of the invention during a lateral scan and the relationship between the position of the points and the contrast generated by each point.

Referring to the drawings, wherein like reference numerals and symbols are used throughout to designate like parts, FIG. 3 is a schematic illustration of the lateral-scanning approach used by the invention, in combination with an array microscope, in order to generate a best-focus map for the sample surface. The diagram of FIG. 3 is based on the embodiment illustrated by FIG. 2, wherein the array microscope 10 has been rotated slightly to cause the alignment of its columns of miniaturized microscopes 12 with the direction of scanning. Assuming, for simplicity of description, that all individual microscopes 12 in the array have parallel optical axes and coplanar focal points, a best-focus plane 14 for the array microscope 10 will lie substantially parallel to it at a fixed focal-length distance D. According to the invention, the sample stage 16 and the array microscope 12 are positioned at an angle a (illustrated between the stage and the best-focus plane) sufficient to permit scanning of the sample through the focal plane 14 of the array microscope. Because of the relatively small focal length associated with large numerical-aperture objectives, it is understood that the angle $\alpha$ and the axial position of the sample stage must be selected carefully to ensure this condition without causing contact between the sample surface and the array microscope.

FIG. 3 illustrates two arbitrary points, P and Q, on the sample surface S as they pass through the best-focus plane 14 in the fields of view of a sequence (1-9) of miniaturized microscopes 12 corresponding to a longitudinal column in the diagram of FIG. 2. The light-intensity contrast measured by each detector in the sequence of microscopes 12 is illustrated for both points as a function of the scan position of the sample surface S as it travels through the scan. At the initial time $t_0$, point Q is within the field of view of the first microscope but below the best-focus plane 14, thereby producing contrast signals that are less than maximum, as illustrated by the corresponding value in the contrast envelope 18. It is noted that each microscope 12 is associated with a sensor array that may have multiple pixels disposed longitudinally along the scanning direction and that, in any event, sufficient light-intensity information is acquired by each miniaturized microscope to calculate contrast. Point P, because of its higher position on the sample surface and the tilt in the scanning plane, is not yet within the field of view of the first microscope at time $t_0$, although close to the best-focus plane 14; accordingly, no contrast is recorded from that point at time $t_0$ (see the corresponding contrast envelope 20).

As the scan of the sample surface S proceeds, point P crosses the best-focus plane first at time $t_1$ because of its initial greater proximity to the focal plane 14. As illustrated in the figure, maximum contrast is detected for point P (see curve 18) as it crosses the focal plane 14 through the field of view of the second microscope in the array sequence. Point Q, viewed by the third microscope, lies still below the best-focus plane and, accordingly, produces a minimum amount of contrast (see curve 20). At time $t_2$, point Q is shown crossing the best-focus plane 14. Therefore, its image, captured by the sixth microscope in the array sequence, produces maximum contrast, as illustrated by curve 20. Point P, imaged by the fifth microscope, is now above the focal plane 14 and produces negligible contrast (curve 18). Finally, at time $t_3$ both points P and Q are beyond the field of view of the array microscope and no corresponding contrast is measured. It is clear that the position x of the sample surface S as each point crosses the best-focus plane 14 is the quantity of interest to practice the invention and that time is only relevant, if necessary, in order to identify such positions during the scan. As is well understood in the art of scanning, time and position measurements are interchangeable so long as the motion profile of the scanner is known.

Figure 4:
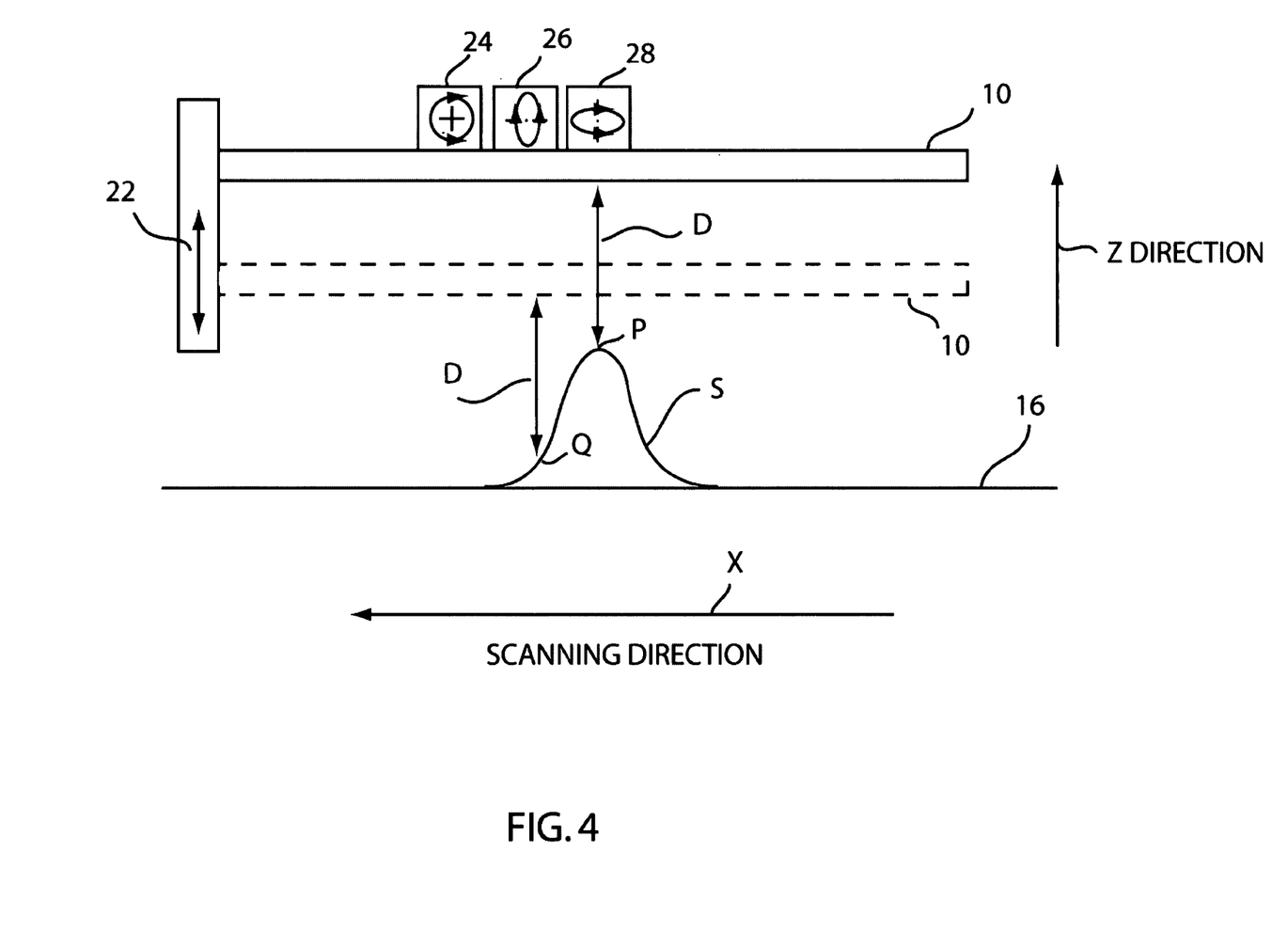
FIG. 4 illustrates the process of adjusting the position of the array microscope according to the invention in order to maintain a best-focus distance from each point being imaged.

Based on the illustration of FIG. 3, it is clear that every point within the strip of the surface S viewed by the sequence of miniaturized microscopes during a scan (corresponding to a column in the array of microscopes of FIG. 2) produces a contrast envelope (curves 18 and 20) that enables the identification of the scan position corresponding to maximum contrast. Still referring to FIG. 3, for example, points P and Q reach their maximum-contrast positions at times $t_1$ and $t_2$, respectively, which in turn correspond to known scanning positions $x_1$ and $x_2$, respectively, in the direction of scanning x. As one skilled in the art would readily recognize, the relative surface height of points P and Q can be easily estimated from the sample stage position corresponding to the scan frame of acquisition and the location of the best-focus image within the microscope array. Thus, the images of points P and Q acquired during a subsequent measurement scan can be optimized by placing each point as close as possible to the focal-plane distance D from the array microscope as each point passes through the field of view of a corresponding miniaturized microscope 12 in the array 10. Note that measurement scans are carried out with the array's orientation of FIG. 1 and substantially parallel to the sample surface, whereby each point on the surface is imaged by a single microscope 12 (disregarding overlaps between fields of view for simplicity), as described in detail in PCT/US02/08286. By providing a mechanism 22 capable of translating the array microscope 10 vertically over the sample stage 16 (or vice versa), the position of the array can be adjusted continuously to track the surface S and place the array at the best-focus distance D as each point is being imaged, as illustrated in FIG. 4.

Inasmuch as each microscope 12 images a different portion of the sample surface S at any given time, additional mechanisms 24 and 26 are required for tilting the array microscope 10 (or equivalently the sample stage 16) both in the x and y directions, respectively (that is, around axes transverse and parallel to the direction of scanning), so that the position of the array can be adjusted to allow multiple portions of the surface S to be viewed from an approximately optimal distance (close to the distance D) at the same time. Note that the mechanism 24 is required also to effect the initial tilt of the array microscope at an angle $\alpha$ with respect to the sample stage, so that the initial pre-scan can be performed to develop the best-focus map of the surface S. Clearly, if the substantially coplanar position of the miniaturized microscopes 12 is fixed, not all points of a rough surface can be imaged from their best-focus distance during a continuous measurement scan (the discrete nature of the objectives limits the resolution of the pre-scan process over a continuous surface), but the idea behind the invention is to maneuver the position of the array microscope 10 during the continuous scan of the sample object so that its surface is preferably imaged completely within the focal depth of the microscope, thereby providing a continuous sharp picture suitable for storage and further analysis.

Figure 6:
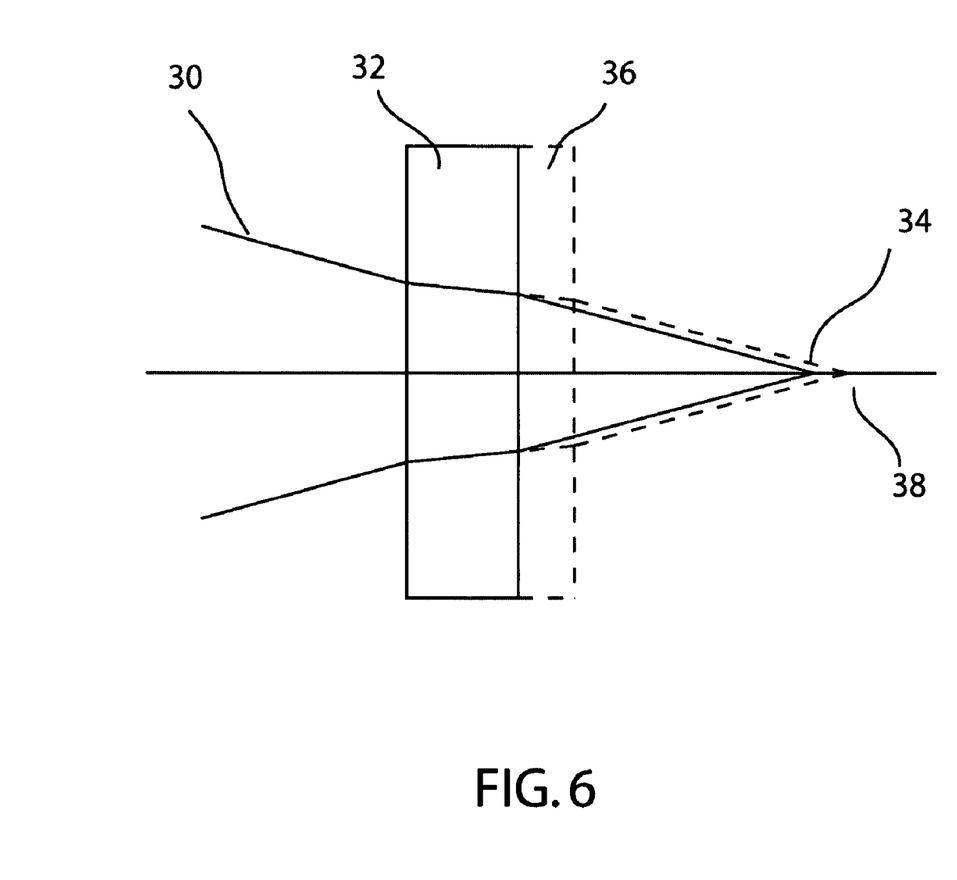
FIG. 6 is a schematic representation of the effect of the two-wedge device of FIG. 5 when used to change the focus point position by varying the thickness of the plane parallel plate formed by the two wedges.

It is anticipated that a further refinement of the invention will include miniaturized microscopes 12 that are individually capable of adjustment along each optical axis to change the position of the respective focal planes of the microscopes. This could be achieved, for instance, by two optical wedges made of a transparent material (in the spectral region of interest) having a sufficiently high refractive index to affect the optical path length of the microscope. For example, optical grade glass would be suitable for this purpose. As illustrated schematically in FIG. 6, the wedges are mounted such that together they form a plane parallel plate. When placed in the path of a converging light beam, such a structure can be used to alter the position of the system's focus point, as shown in FIG. 6. This phenomenon is well known in the art. See, for example, Rudolf Kingslake, "Lens Design Fundamentals," Academic Press, New York, 1978, pp.119-120.

With reference to FIG. 6, a converging beam 30 focused by the objective of each microscope 12 passes through a block 32 of optical material toward a focal point 34. As is well understood in the art, when the thickness of the block 32 is increased by a given amount, as illustrated by the dashed line 36, the focus point 34 moves away from the block to a new focus point 38. More precisely, the shift in focus is proportional to the thickness of the glass multiplied by the quantity (one minus one over index of refraction). Thus, it is apparent that the position of the focal point can be manipulated by changing the thickness of the glass block 32, which is equivalent to changing the optical path length of the microscope.

Figure 5:
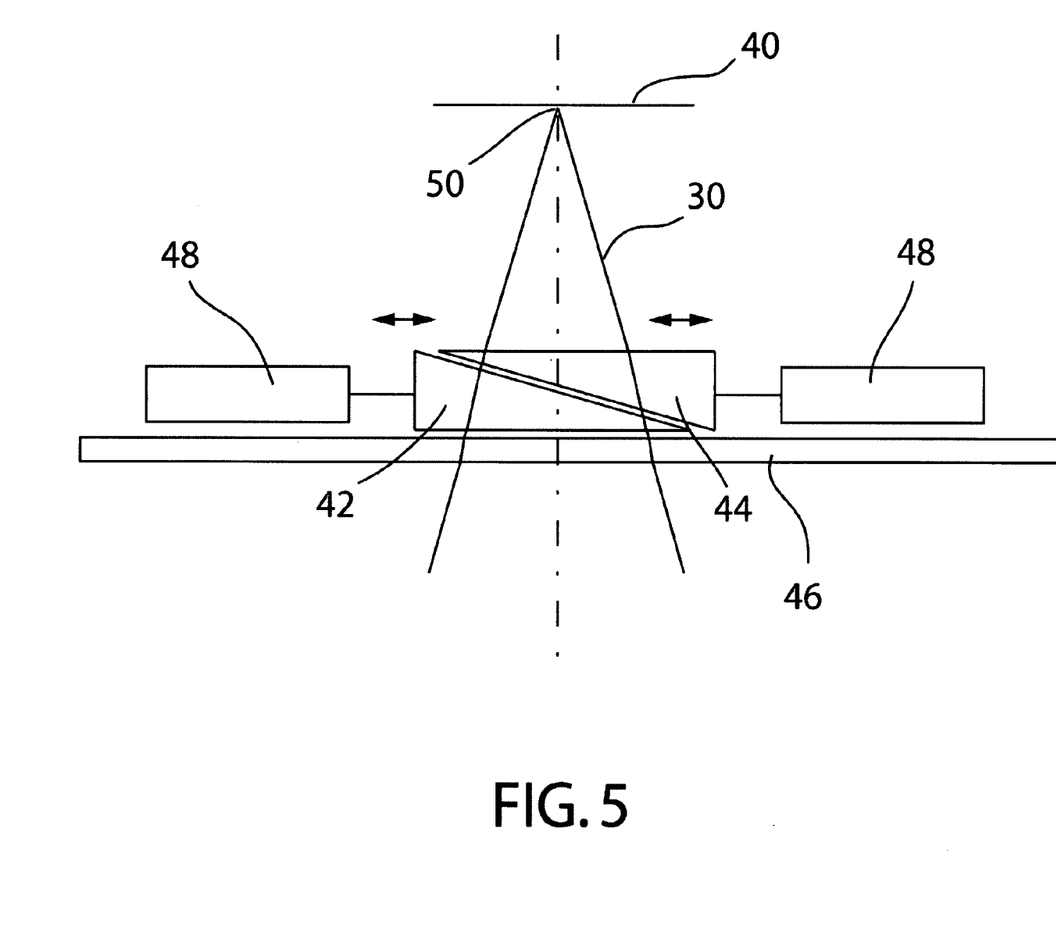
FIG. 5 is a schematic representation of a two-wedge device in plane-parallel-plate configuration used to vary the optical path length of a light beam focused by a microscope lens in order to change the position of the focused image plane.

This phenomenon can be used advantageously for compensating variations in the focal length of individual objectives in the array of the invention or for varying the working distance of a microscope in the array. As seen in FIG. 5, the light beam 30 that converges towards the detector plane 40 passes through the double-wedge assembly 42,44. The wedges are placed on a substrate plate 46 that is transparent at the wavelengths used for imaging. The wedges 42,44 are mobile and can be moved towards or away from each other by means of a pair of actuators 48. These actuators convert a driving signal, such as an electrical signal in the form of current or voltage, to a lateral translation of the wedges, so that the total optical thickness of the assembly changes and shifts the axial focal position 50 of the converging beam 30 in the manner illustrated in FIG. 6. Many technologies are available to produce actuators 48 suitable for this application. See, for example, "The MEMS Handbook," Mohamed Gad-el-Hak Ed., CRC Press, New York, N.Y., 2001. One of the most promising is a technology known in the art as a LIGA process which permits the manufacture of actuators that can deliver up to 1 mm of travel, sufficient to fulfill the axial displacement requirements for independently adjusting the focal length of each microscope in the array of the invention. The LIGA process is described, for example, in U.S. Pat. No. 6,517,665 and No. U.S. Pat. No. 6,332,568.

If the invention is practiced with an array microscope 10 having miniature microscopes 12 that are independently adjustable along their respective axes, it is clear that the information acquired during a pre-scan can then be utilized to optimize the focal point of each individual microscope as the array scans the sample surface during the measurement data-acquisition process. Since the pre-scan provides a measure of the focal distance corresponding to each sampled point on the surface of the test object, that information is used to adjust the axial positions of the microscopes during the subsequent measurement scan so that each surface point is imaged substantially from its focal distance. As the array 10 of microscopes 12 is scanned along the test surface (or vice versa), the focal distance of each microscope is continuously adjusted using the actuators 48 to ensure that each portion of the test surface is imaged substantially in focus. A complete description of an array microscope wherein the position of each miniaturized objective is independently adjustable is provided in commonly owned U.S. application entitled "Multi-Axis Imaging System Having Individually Adjustable Elements," filed on Apr. 29, 2003, herein incorporated by reference.

According to the embodiment of the invention illustrated in FIGS. 2-4, the array microscope 10 is initially rotated by a mechanism 28 to align its columns of miniaturized microscopes with the direction of scanning of the system. The array is then tilted to allow lateral scanning, as described. The sample surface is pre-scanned with this array orientation in order to generate a map of best-focus positions for the surface areas viewed during the measurement scan. Subsequently, the orientation of the array is returned to its measurement position (illustrated in FIG. 1) and the tilt is removed. Finally, the measurement scan is performed while adjusting the height, tip and tilt of the array to track, to the extent possible, the best focus-map generated in the prior step. While this lateral-scanning approach yields a best-focus map from a single continuous scan, it requires time-consuming alignment steps and does not provide a complete best-focus map of the sample surface.

According to another embodiment of the invention designed to overcome these shortcomings, the best-focus pre-scan is performed maintaining the array orientation of FIG. 1 (that is, without re-orienting it to align its columns with the direction of scanning). As a result, every point of the sample surface is imaged (note again that not all points need to be imaged because of the slow varying focal distance) by the array microscope during the pre-scan, but a single contrast value is acquired for each point because only one miniaturized microscope 12 in the array sees the point during the scan. Accordingly, the lateral-scan pass of the sample surface produces a contrast value for each discrete portion of the surface corresponding to the field of view of an array element, or to a smaller section thereof, depending on the size of the scanning step between acquisition frames. Because the sample stage scans across the best-focus plane of the array microscope, most surface points are imaged from above or below the focal plane, and a few points are imaged substantially from the focal plane. Therefore, if the sample consists of a material with comparable optical properties throughout its surface, the highest values of contrast can be assumed to correspond to best-focus positions, and lower values to correspond to points below or above it.

As is well understood in the art, an image appears in focus when the fine details in its structure can be resolved clearly, the edges appear crisp, and the contrast is high. Accordingly, these parameters can be used in algorithms for automatic focus detection and adjustment. Contrast and high frequency content in an image are the most commonly used parameters. Contrast is typically defined as the amplitude of intensity variations with respect to mean value. Alternatively, it can be expressed as:

$$\text{Contrast} = \frac{I_{\max} - I_{\min}}{I_{\max} + I_{\min}}$$

where $I_{max}$ and $I_{min}$ are maximum and minimum intensities in the image, respectively. The spatial frequency content in the image may be defined using Fourier analysis (that is, the image is decomposed into elementary spatial frequency components). Sharp or 'in-focus' images are characterized by larger high-frequency content with respect to the same out-of-focus images. This is expected because the 'crisp' features of an image are defined by high spatial frequencies. However, using high-pass filtering for focus detection has the disadvantage that intensity noise of the detector is also collected. Thus, it is more advantageous to use mid-frequency content (defined as about 0.1 to about 0.9 of Nyquist frequency), which is also sensitive to focus but reduces the influence of detector noise and of artifacts in the image, such as caused by dust. In practice, even the use of the entire frequency spectrum (greater than zero to one Nyquist) will enable the invention, but the use of mid-range frequencies is preferred.

Figure 7:
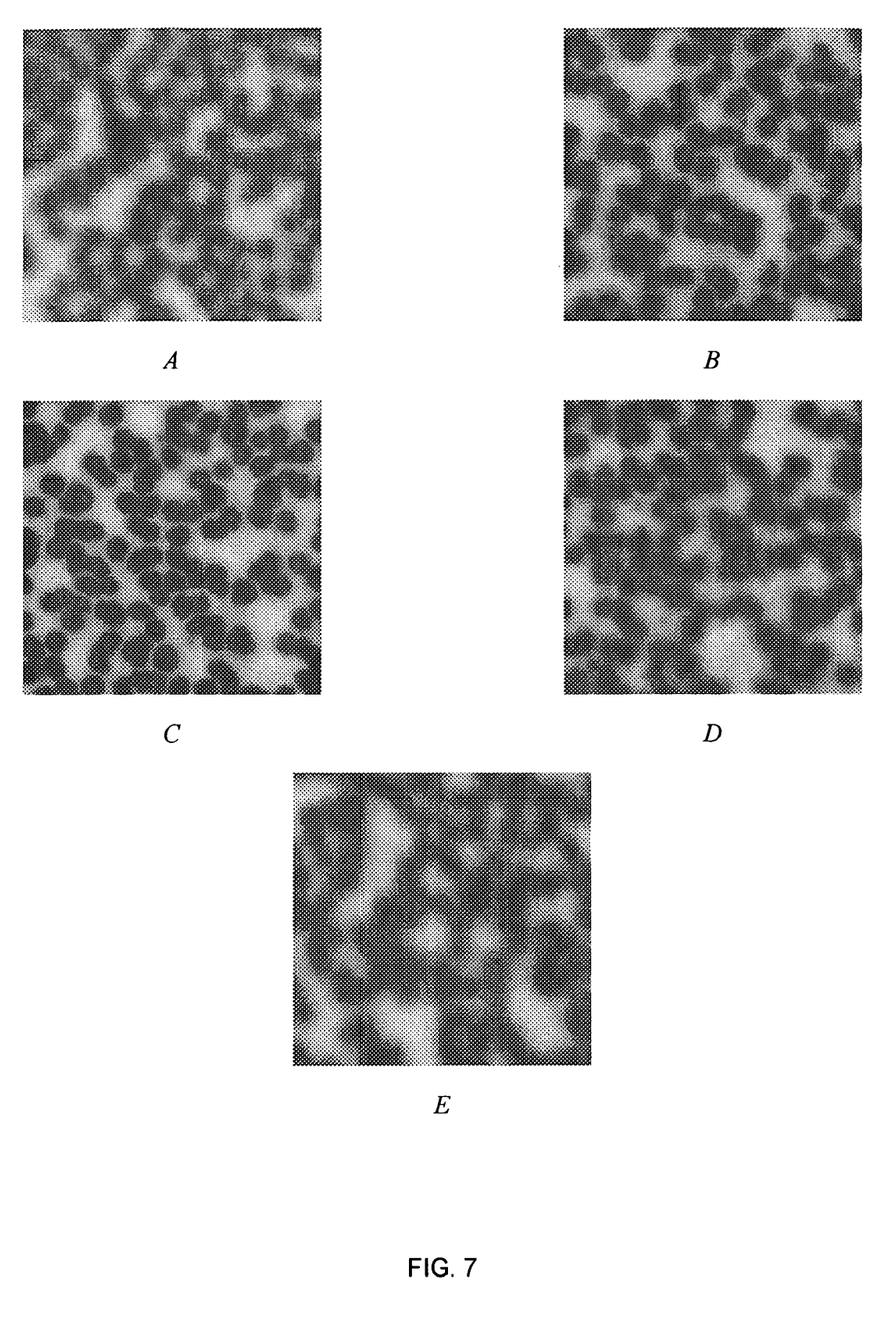
FIG. 7 is a series of images of a blood-smear sample illustrating different degrees of focusing as the sample is scanned laterally according to the invention.
Figure 8:
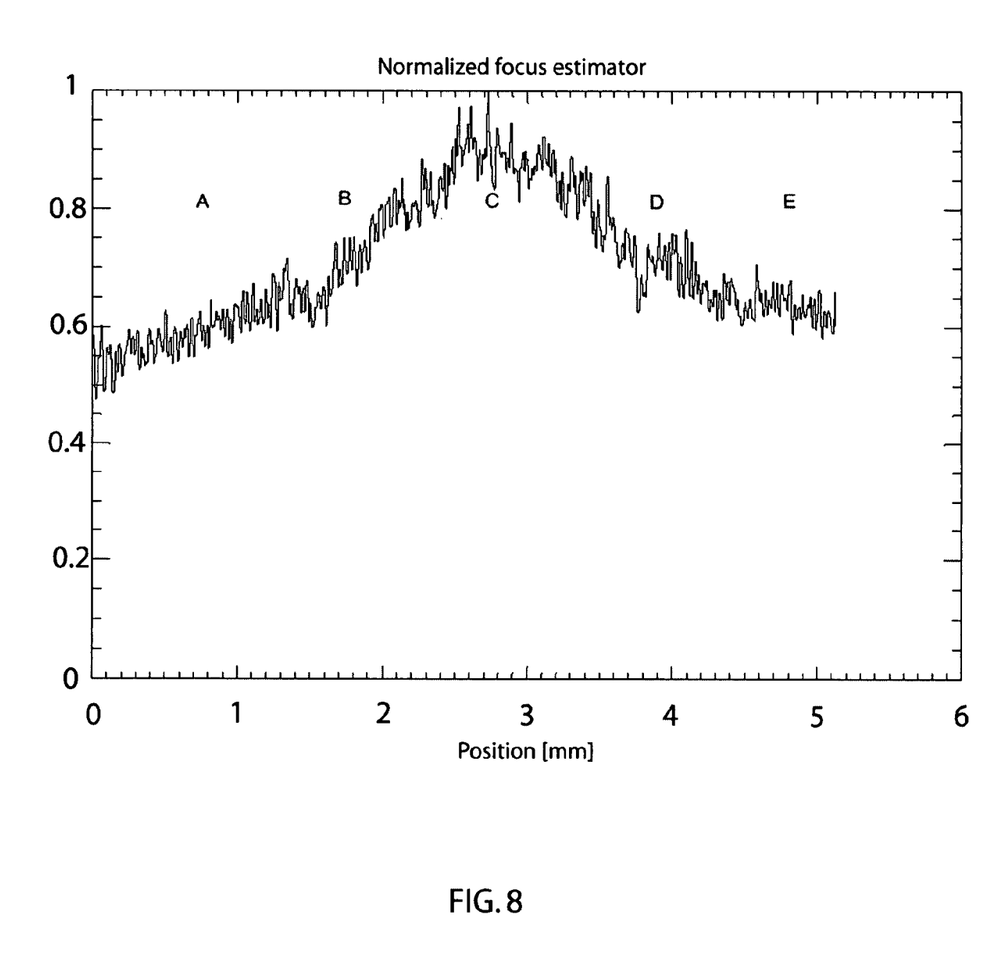
FIG. 8 is a plot of normalized mid-range frequency content (0.1 to 0.9 of Nyquist frequency) as a function of position as the blood-smear sample is scanned laterally according to the invention to produce the series of images illustrated in FIG. 7.
Figure 9:
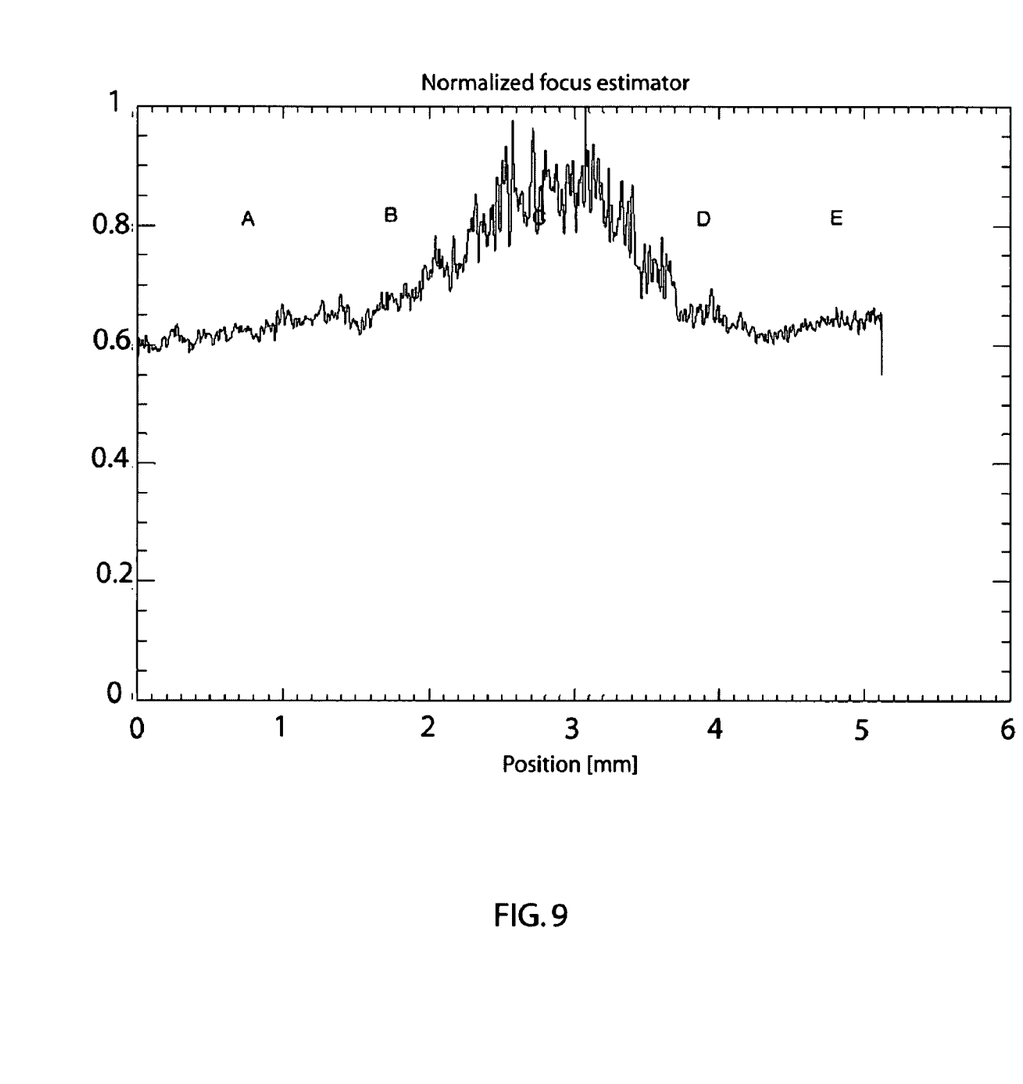
FIG. 9 is a plot of normalized mid-range frequency content (0.25 to 0.75 of Nyquist frequency) as a function of position as the blood-smear sample is scanned laterally to produce the series of images illustrated in FIG. 7.
Figure 10:
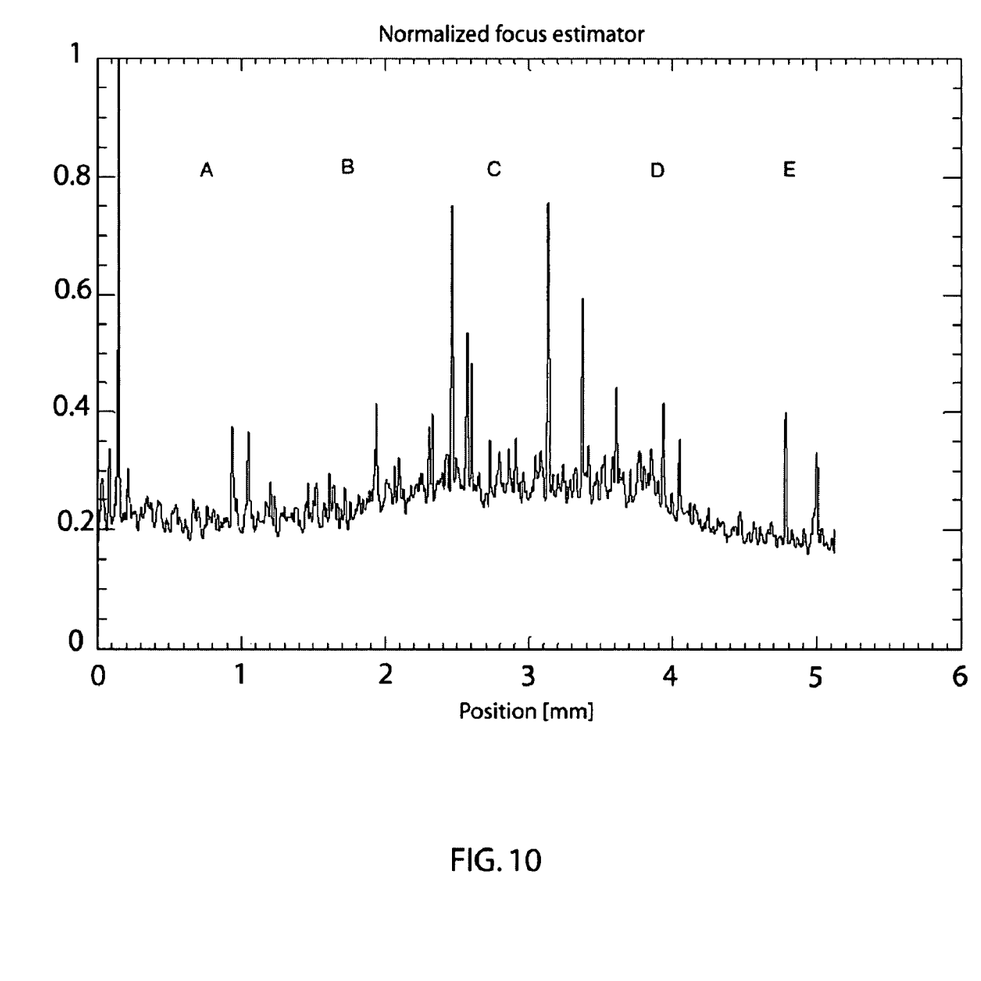
FIG. 10 is a plot of contrast as a function of position as the blood-smear sample is scanned laterally to produce the series of images illustrated in FIG. 7.

An example of the use of a focus-estimator algorithm based on spatial mid-frequency content is shown in FIG. 7 for a blood smear image. The analysis was run on a microscope slide that was scanned through focus along its longer dimension. The locations on the sample surface appearing in the images marked A through E in FIG. 7 were moved through the focal plane of the array microscope in a lateral scan according to the invention. The images A through E show the gradual progression from out-of-focus positions (images A and B) to an in-focus-position (image C), and then again to out-of-focus positions (images D and E). These images show that the spatial mid-frequency content of an optical signal can be effectively used for focus estimation, as also clearly illustrated by the mid-range frequency plots shown in FIGS. 8 and 9. A comparable test with contrast showed instead that it is not as discriminating and is susceptible to dirt spots on the slide surface (which produce peaks), as illustrated in FIG. 10. Therefore, the use of spatial frequency information is preferred over contrast for practicing the invention even though contrast is most commonly used in the art to find best focus.

While the invention has been described in terms of scanning the sample stage with respect to the array microscope, it is understood that the same results can be achieved in equivalent manner by scanning the microscope in relation to a fixed sample stage. Therefore, the terms scanning and translating should be so interpreted for the purposes of this specification of the invention and appended claims. Similarly, the motion of the lateral scanning process has been described such that the sample converges toward the array microscope, but the reverse could be done in equivalent manner. In fact, for applications where the proximity between the two structures may result in damaging contact, scanning away from the array's objectives may be preferable. In such case, any contact would occur at the outer edge of the array's structure rather than with the lower rows of objectives under the array, thereby preventing damage to optical elements.

Various other changes in the details, steps and components that have been described may be made by those skilled in the art within the principles and scope of the invention herein illustrated and defined in the appended claims. For example, while the invention has been described in relation to an imaging system, it is clear that it applies equally to any system dedicated to optical measurements, such as profilometers, spectroscopes and polarimeters. That is, the best-focus map obtained through lateral scanning according to the invention is then advantageously used to carry out in optimal focus condition the subsequent measurement to which the system is dedicated.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A microscope comprising a fixture for holding a sample surface; an objective with an optical axis directed toward the sample surface; a light detector for detecting a signal received from the sample surface; means for positioning the fixture at a predetermined tilt angle with respect to the objective in a direction of scanning; means for scanning the sample surface laterally through a best-focus plane of the objective in order to produce a plurality of signals corresponding to a plurality of points on the sample surface; and means for analyzing said plurality of signals to estimate a best-focus axial position for each of said plurality of points relative to the microscope objective.

2. The microscope of claim 1, wherein said microscope is an array microscope and said objective comprises a plurality of objectives of individual miniaturized microscopes in the array microscope.

3. The microscope of claim 2, further comprising means for positioning the fixture at variable transverse angles with respect to the objective.

4. The microscope of claim 2, wherein said signals include light intensity and said means for analyzing said plurality of signals includes means for calculating spatial frequency content in the plurality of signals.

5. The microscope of claim 4, wherein said means for analyzing said plurality of signals further includes means for identifying scan positions corresponding to a best-focus axial position for said plurality of points using frequency-content information.

6. The microscope of claim 5, further comprising means for performing a measurement scan while maneuvering said fixture so that each of said plurality of points on the sample surface is approximately at said best-focus axial position when imaged by a corresponding objective in the array microscope.

7. The microscope of claim 2, wherein said signals include light intensity and said means for analyzing said plurality of signals includes means for calculating contrast in the plurality of signals.

8. The microscope of claim 7, wherein said means for analyzing said plurality of signals further includes means for identifying scan positions corresponding to a best-focus axial position for said plurality of points using maximum-contrast information.

9. The microscope of claim 8, further comprising means for performing a measurement scan while controlling a relative position between said fixture and said objective so that each of said plurality of points on the sample surface is approximately at said best-focus axial position when imaged by a corresponding objective in the array microscope.

10. The microscope of claim 1, wherein said signals include light intensity and said means for analyzing said plurality of signals includes means for calculating spatial frequency content in the plurality of signals.

11. The microscope of claim 2, wherein said signals include light intensity and said means for analyzing said plurality of signals includes means for calculating contrast in the plurality of signals.

12. The microscope of claim 1, further comprising means for positioning the fixture at variable transverse angles with respect to the objective.

13. A method of imaging a sample surface comprising the following steps:
  (a) providing a microscope that comprises a fixture for holding a sample surface; an objective with an optical axis directed toward the sample surface; and a light detector for detecting a signal received from the sample surface;
  (b) tilting the objective's optical axis with respect to the fixture in a direction of scanning;
  (c) scanning the sample surface laterally through a best-focus plane of the objective in order to produce a plurality of signals corresponding to a plurality of points on the sample surface;
  (d) analyzing said plurality of signals to estimate a best-focus axial position for each of said plurality of points relative to the microscope objective; and
  (e) performing a measurement scan while controlling a relative position between said fixture and said objective so that each of said plurality of points on the sample surface is approximately at said best-focus axial position when imaged by the objective.

14. The method of claim 13, wherein said microscope is an array microscope, said objective comprises a plurality of objectives of individual miniaturized microscopes in the array microscope, and steps (c), (d) and (e) are carried out imaging said plurality of points with corresponding miniaturized objectives in the array microscope.

15. The method of claim 14, wherein said signals include light intensity and said step of analyzing the plurality of signals includes the step of calculating spatial frequency content.

16. The method of claim 15, wherein said step of analyzing the plurality of signals includes the step of identifying scan positions corresponding to a maximum frequency content for said plurality of points, and the step of developing a best-focus axial-position map for use while performing said measurement scan.

17. The method of claim 16, wherein said step of developing a best-focus axial-position map is accomplished by aligning columns of said miniaturized microscopes in the array microscope with said direction of scanning prior to performing step (c), by acquiring multiple frequency-content data for each of said plurality of points on the sample surface during step (c), and by identifying scan positions corresponding to a best-focus axial position for said plurality of points using maximum frequency-content information.

18. The method of claim 14, wherein said signals include light intensity and said step of analyzing the plurality of signals includes the step of calculating contrast.

19. The method of claim 18, wherein said step of analyzing the plurality of signals includes the step of identifying scan positions corresponding to a maximum contrast for said plurality of points, and the step of developing a best-focus axial-position map for use while performing said measurement scan.

20. The method of claim 19, wherein said step of developing a best-focus axial-position map is accomplished by aligning columns of said miniaturized microscopes in the array microscope with said direction of scanning prior to performing step (c), by acquiring multiple contrast data for each of said plurality of points on the sample surface during step (c), and by identifying scan positions corresponding to a best-focus axial position for said plurality of points using maximum-contrast information.

21. A microscope image produced by the method of claim 20.

22. A microscope image produced by the method of claim 14.

23. The method of claim 13, wherein said signals include light intensity and said step of analyzing the plurality of signals includes the step of calculating spatial frequency content.

24. The method of claim 13, wherein said signals include light intensity and said step of analyzing the plurality of signals includes the step of calculating contrast.

25. The method of claim 13, wherein said measurement in step (e) is a profilometric measurement.

26. A microscope image produced by the method of claim 13.

27. A method of developing a best-focus axial-position map of a sample surface for improving microscope imaging, comprising the following steps:
  (a) providing a microscope that comprises a fixture for holding a sample surface; an objective with an optical axis directed toward the sample surface; and a light detector for detecting a signal received from the sample surface;
  (b) tilting the objective's optical axis with respect to the fixture in a direction of scanning;
  (c) scanning the sample surface laterally through a best-focus plane of the objective in order to produce a plurality of signals corresponding to a plurality of points on the sample surface; and
  (d) analyzing said plurality of signals to estimate a best-focus axial position for each of said plurality of points relative to the microscope objective.

28. The method of claim 27, wherein said microscope is an array microscope, said objective comprises a plurality of objectives of individual miniaturized microscopes in the array microscope, and steps (c) and (d) are carried out imaging said plurality of points with corresponding miniaturized objectives in the array microscope.

29. The method of claim 28, wherein said signals include light intensity and said step of analyzing the plurality of signals includes the step of calculating spatial frequency content.

30. The method of claim 28, wherein said signals include light intensity and said step of analyzing the plurality of signals includes the step of calculating contrast.

31. The method of claim 28, further including the step of aligning columns of said miniaturized microscopes in the array microscope with said direction of scanning prior to performing step (c), the step of acquiring multiple frequency-content data for each of said plurality of points on the sample surface during step (c), and the step of identifying scan positions corresponding to a best-focus axial position for said plurality of points using maximum frequency-content information.

32. A best-focus axial-position map of a sample surface produced by the method of claim 31.

33. The method of claim 28, further including the step of aligning columns of said miniaturized microscopes in the array microscope with said direction of scanning prior to performing step (c), the step of acquiring multiple contrast data for each of said plurality of points on the sample surface during step (c), and the step of identifying scan positions corresponding to a best-focus axial position for said plurality of points using maximum-contrast information.

34. A best-focus axial-position map of a sample surface produced by the method of claim 33.

35. A best-focus axial-position map of a sample surface produced by the method of claim 28.

36. The method of claim 27, wherein said signals include light intensity and said step of analyzing the plurality of signals includes the step of calculating spatial frequency content.

37. The method of claim 27, wherein said signals include light intensity and said step of analyzing the plurality of signals includes the step of calculating contrast.

38. A microscope image produced by the method of claim 17.

39. A best-focus axial-position map of a sample surface produced by the method of claim 27.

40. An array microscope comprising a plurality of objectives of individual miniaturized microscopes with respective optical axes directed toward a sample surface; a fixture for holding said sample surface; a light detector for detecting a signal received from the sample surface; means for adjusting a relative orientation and a distance of said plurality of objectives with respect to said sample surface; means for scanning the sample surface to produce a plurality of signals corresponding to a plurality of points on the sample surface; and means for analyzing said plurality of signals to estimate a best-focus axial position for each of said plurality of points relative to the microscope objective.

41. The array microscope of claim 40, wherein said means for analyzing said plurality of signals further includes means for identifying scan positions corresponding to a best-focus axial position for said plurality of points.

42. The array microscope of claim 40, further comprising means for performing a measurement scan while controlling a distance between said fixture and said objective so that each of said plurality of points on the sample surface is approximately at said best-focus axial position when imaged by a corresponding objective in the array microscope.

43. A method of developing a best-focus axial-position map of a sample surface for improving microscope imaging, comprising the following steps:
  (a) providing a microscope that comprises a fixture for holding a sample surface; an objective with an optical axis directed toward the sample surface; and a light detector for detecting a signal received from the sample surface;
  (b) adjusting a relative orientation and a distance of said objectives with respect to said sample surface;
  (C) scanning the sample surface to produce a plurality of signals corresponding to a plurality of points on the sample surface; and
  (d) analyzing said plurality of signals to estimate a best-focus axial position for each of said plurality of points relative to the microscope objective.

44. The method of claim 43, wherein said microscope is an array microscope, said objective comprises a plurality of objectives of individual miniaturized microscopes in the array microscope, and steps (c) and (d) are carried out imaging said plurality of points with corresponding miniaturized objectives in the array microscope.

* * * * *

UNITED STATES PATENT AND TRADEMARK OFFICE
CERTIFICATE OF CORRECTION

PATENT NO.       : 7,330,574 B2
APPLICATION NO.  : 10/431937
DATED            : February 12, 2008
INVENTOR(S)      : Artur G. Olszak It is certified that error appears in the above-identified patent and that said Letters Patent is hereby corrected as shown below:

in the title page, correct the assignee name from "Ometrix" to --DMETRIX--;

in claim 11, col. 13, line 3, replace "claim 2" with --claim 1--; and in claim 43, col. 16, line 19, replace "(C)" with --(c)--.

Signed and Sealed this

Seventeenth Day of June, 2008

JON W. DUDAS
*Director of the United States Patent and Trademark Office*